Patented May 1, 1951

2,550,981

UNITED STATES PATENT OFFICE 2,550,981

METHOD OF INHIBITING FOGS IN HYDROCARBON PRODUCTS

William F. Eberz, Altadena, Calif., assignor to Petrolite Corporation, Ltd., Wilmington, Del., a corporation of Delaware No Drawing. Application July 12, 1947, Serial No. 760,701

14 Claims. (Cl. 44—71)

My invention relates to the treatment of hydrocarbon products to eliminate or inhibit "fogs" therein.

The term "fog," as herein used, does not refer to the aerosol type of fog but, rather, to the cloudiness caused by the presence of minute droplets of an aqueous medium suspended in a hydrocarbon product. In the present application the term "hydrocarbon products" is used with reference to transparent or semi-transparent hydrocarbon products, usually but not invariably overhead fractions such as gasoline, kerosene, Diesel fuel, stove oil, gas oil, cleaners' solvent, benzene, toluene, xylene, etc.

Many hydrocarbon products found in commerce contain dissolved water which is precipitable when subjected to reduction in temperature or other changes in equilibrium, resulting in the precipitation of droplets which are visible as a fog. In other instances, hydrocarbon products are encountered which contain such fogs. Such precipitates are detrimental to the value of such products. This is particularly true in the transparent or semi-transparent hydrocarbon oils where such fogs make the oil less desirable and affect the merchantability of the oil. Particular examples of this might be kerosene, gasoline, stove oil and the like, which are frequently manufactured in the warmer climate of the Gulf Coast States and then shipped and stored in the northern states with the result that the oils become fogged or cloudy, even though originally clear and bright.

This invention in its principal aspects is concerned with the prevention, elimination or suppression of fog due to precipitation of water particles in hydrocarbon products arising from various causes, particularly temperature drop, instability resulting from super-saturation, etc. This objective is accomplished by the use of minute quantities of additives, as hereinafter described. The invention is important in connection with fogs caused by any precipitated aqueous phase or dilute aqueous solution, e. g., a dilute solution of an acid, salt, base or organic compound, as well as pure water. For sake of convenience, any such aqueous media are hereinafter referred to merely as water in view of the fact that it is the aqueous content which gives rise to the problem here solved.

Another important aspect, from the practical standpoint, is the prevention of the precipitation of water from hydrocarbon distillates and other products of conventional refining processes, where there has been prior contact with water. Precipitation may then occur during passage through the colder portions of pipe lines, such aqueous phase frequently being highly corrosive and sometimes separating from the hydrocarbon product to produce pockets in the pipe lines.

All hydrocarbon products do not necessarily produce fogs upon the reductions in temperature often met in commerce, for various reasons. The present invention is concerned with those hydrocarbon products which are susceptible to fogging. The prevention or elimination of fogging is a long-recognized problem of commercial importance, as may be ascertained, among other references, by that to be found in National Petroleum News of January 3, 1945, R-63. Thus, it has been previously proposed to remove the dissolved moisture from these hydrocarbon products by means of solid desiccating agents such as activated alumina, silica gel, etc. These processes are functional but costly in material, operation and maintenance. In many instances the dissolved water has been removed by blowing the hydrocarbon product with dry air. This method is highly objectionable because of loss of valuable volatile components of the hydrocarbon product and because of the introduction of oxygen into the system, leading to oxidative degradation of the product as manifested by damage to color. Other solutions to the problem are characterized by a mechanical approach.

I believe that my invention represents the first practical solution to this problem of inhibiting fog formation, permitting this to be accomplished at a very low cost in materials, equipment and labor, and without any deleterious effect upon the oil itself. This is in contradistinction to all prior proposals, many of which detrimentally modify the hydrocarbon oil. In the present process of prevention of fog formation, the additives are employed in such small amounts as to make the processed oil identical in all other respects with the untreated oil.

The invention is concerned with the presence or potential presence of only those fogs which are visible, these being detectable by visual or light-transmission methods. Suspended water droplets in a hydrocarbon product produce visible fogs only if the droplets are of minute size. Water droplets of large size do not necessarily produce visible fogs and will often settle out on standing. However, upon cooling of a hydrocarbon product containing dissolved water to saturation, at least a portion of the dissolved water will precipitate as a visible fog, the water droplets being of such small size as to remain in suspension for long periods of time, often indefinitely. Droplets of this size give rise to the fogs with which this invention is concerned.

A perfectly clear hydrocarbon product may contain water to saturation at its existing temperature, in which event a cooling of only a few degrees will usually produce an objectionable fog. If such a clear hydrocarbon product does not contain dissolved water to saturation, cooling to the temperature at which it will be saturated will not produce such a fog, but cooling several degrees lower will. If a hydrocarbon product contains such a fog at an existing temperature it is usually evidence that the dissolved water is present to saturation and that more water will precipitate to increase the fog density if the product is cooled below such existing temperature through a given temperature range. The invention contemplates incorporation of a minute quantity of a chemical into the hydrocarbon product to clear such an existing fog and inhibit the hydrocarbon product against fog formation when cooled through such range.

The amount of water which can be dissolved in a hydrocarbon product depends upon the particular product and the temperature thereof. The solubility of water in the lighter petroleum fractions such as gasoline is about .01% at ordinary temperatures. That for the heavier fractions may be considerably less, whereas aromatic hydrocarbons such as benzene may dissolve water to the extent of approximately 0.1%. As to temperature, there is approximately a tenfold increase in solubility for a 100° F. temperature difference. A fog may result from the solubility decrease due to a small temperature drop and may be visible when the precipitated water is only a few thousandths of a per cent. An objectionable fog may appear on a temperature drop of approximately 10° F. or less.

I have found that hydrocarbon products can be protected against fogging upon temperature reduction by subjecting the product to the action of extremely minute amounts of a surface-active agent, also, that by employing somewhat larger, though still minute, amounts of such surface-active agents, existing fogs can be eliminated and the hydrocarbon product protected to the same extent against later fogging upon reduction in temperature. In my copending application Serial No. 760,707, filed July 12, 1947, there is disclosed a wide variety of surface-active agents which can be added to the hydrocarbon product as surface-active compounds or which can be formed in situ in the hydrocarbon product. That application generically claims the invention and specifically claims the addition of surface-active compounds. The present application is specifically concerned with the formation of the surface-active agents in situ by reaction between the additive and some component naturally in or previously added to the hydrocarbon product.

Generally stated, it is an object of the present invention to react two materials in situ in a hydrocarbon product to produce a surface-active agent capable of clearing existing fogs resulting at least in part from precipitation of water of solubility and capable of inhibiting the hydrocarbon product against formation of such fogs upon change in equilibrium conditions such as would result, for example, by reduction in temperature. As the surface-active agent is usually a salt, ester or soap, the reactive materials employed can generally be classed as acidic and alkaline. It is within the contemplation of the present invention that such acidic and alkaline materials be separately added to the hydrocarbon or that one of these reactive materials be added to a hydrocarbon product which already contains the other reactive material. At present it appears that the process finds greatest commercial importance in adding an alkaline material to a hydrocarbon product already containing an acidic material and the following description will be primarily directed to such a process, by way of illustration.

Many hydrocarbon products contain or can be made to contain acidic materials suitable for the formation of surface-active agents. Such acidic materials may be native organic acids, e. g., naphthenic acids or other acids strong enough to react with the alkaline material later added. Alternatively, a suitable acidic material such as naphthenic acids may be added to the hydrocarbon product as a part of the process.

As to the alkaline material added to react with such acids to form the desired surface-active agent, this may be any base capable of reacting with the acid or acids to form a salt which is oil-soluble, within the concentrations used, preferably a salt which is fairly highly ionized. It should preferably be a substantially anhydrous base so as to avoid adding additional water to the hydrocarbon product, which is already saturated completely or partially with water. Ammonia is an excellent alkali to employ when reacting naphthenic acids, producing ammonium naphthenates which are excellent fog-suppressing agents. I may also use any of the alkyl amines of sufficient basicity, e. g., methyl amine or ethyl amine or materials in which one or more hydrogen atoms of ammonia have been replaced by organic radicals. The hydrocarbon radical need not be alkyl but may be alicyclic or aralkyl, as exemplified by cyclohexylamine and benzylamine. Additionally, such hydrocarbon radicals may be substituted, as, for example, triethanolamine, provided that there is no appreciable reduction in basicity. Briefly stated, such compounds are characterized by the fact that there is no negative radical directly united with the amino nitrogen atom, such as aryl radicals, acyl radicals, etc. Any of the quaternary ammonium bases can also be used, for example, cetyl pyridinium hydroxide. A very strong solution of sodium hydroxide (about 15N or more) may be employed as can also a similarly concentrated solution of potassium hydroxide. However, I prefer to employ nitrogen-containing bases.

The optimum amount of the alkaline material will vary with the extent of fog suppression desired, e. g., the desired range over which the hydrocarbon product can be cooled without producing objectionable fogs, and to some extent with the amount, if any, of fog existing at the time the acidic and alkaline materials react in situ to form the surface-active agent. Protection over a temperature range of about 40°, e. g., against a temperature drop of about 75° F. to 35° F., is usually sufficient from a commercial standpoint. Only minute amounts of the alkaline material are required, e. g., enough to partly but not necessarily completely neutralize the naphthenic acids in the hydrocarbon product. Addition of somewhat more than that amount required to give the desired inhibition against fog formation is not detrimental but if larger excesses are used or even if enough of the alkaline material is added to neutralize completely the naphthenic acids, the resulting naphthenate may precipitate and settle some of the unduly large amount of the naphthenate.

The amount of alkaline material added to react with acids in the hydrocarbon product will usually be found in the range of about .035–1.75 millimols/liter to give protection during a temperature drop of about 75° F. to 35° F. If the hydrocarbon product contains existing fogs, resulting from precipitation of water, such amounts of alkaline material will usually suffice to clear such fogs and give protection against further fog formation over a somewhat narrower range of temperature change. If protection over a larger temperature range is desired, whether or not an initial fog is present, the amount of alkaline material may be correspondingly increased.

The alkaline material, and if desired, the acidic material, may be added to the hydrocarbon product by batch or continuous methods. A particularly desirable embodiment of the invention involves a dual neutralization as follows:

Many hydrocarbon products naturally contain relatively larger amounts of acidic materials, e. g., naphthenic acids, suitable to the process. Conventionally, these are often neutralized by mixing with the hydrocarbon product a suitable aqueous alkaline solution, the amount of alkali being in excess of that stoichiometrically equivalent to the acidic materials to insure complete reaction therewith. In the case of naphthenic acids, a solution of sodium hydroxide is usually used, the reaction producing aqueous sodium naphthenates which can be separated from the hydrocarbon product and acidulated to produce marketable naphthenic acids. In accordance with the present invention, the amount of alkaline solution is reduced to react only a part of the naphthenic acids or other acidic material and leave a small amount thereof in the hydrocarbon product, after separation of the soaps therefrom. In a continuous process, the amount of alkaline solution is preferably adjusted to have a predetermined and constant deficiency to leave a small and substantially constant amount of unreacted naphthenic acids or other acidic material in the effluent hydrocarbon product. To this effluent is then added a sufficient amount of substantially anhydrous alkaline material of the type previously mentioned to form the surface-active agent in situ and clear the product of any existing fog while giving the desired inhibition to later fog formation. While the alkaline material can be added by batch or continuous methods, the latter is preferred whereby the entire process can be continuously performed.

Such a process has the very marked advantage of inhibiting the hydrocarbon product against fog at a minimum of expense. By splitting up the alkali addition into such steps and using an appropriate alkali in the fog-inhibiting step there is only a negligible reduction in the amount of aqueous soaps which separate and a fog-inhibited product is produced.

The unreacted acids in the separated hydrocarbon product should be sufficient to form the surface-active agents needed for the fog elimination and/or inhibition. Usually the unreacted acids need be present in amount no greater than .035 to 1.75 millimols per liter on the basis of the amounts of alkaline material previously mentioned and the degree of protection against fogs provided by the resulting reaction products formed in situ. A larger amount of unreacted acids may be left in the hydrocarbon product if inhibition against fog formation over a larger temperature range is desired, in which event the amount of substantially anhydrous alkaline material will be slightly increased, or if a slightly acidic product can be tolerated, in which event the acids will not be completely reacted by the amount of the alkaline material employed.

Such a dual-addition process has the additional advantage that if the separation of the aqueous soaps is not complete, the cloud resulting from the presence of residual soaps can be removed by the addition of the substantially anhydrous alkaline material.

In general, whether or not such dual-addition process is employed, the substantially anhydrous alkaline material can be added to the hydrocarbon product at any existing temperature. However, with high temperature products, e. g., products at a temperature of 100° F. or higher, it is often preferable to cool the product to some temperature intermediate the highest and the lowest temperatures between which protection against fog is desired and to add the alkaline material at such intermediate temperature in amount sufficient to clear any fog formed during the cooling and sufficient to protect against fog formation during later cooling to such lowest temperature at which protection is desired.

In the commercial application of the process it is desirable to add the fog suppressant at the lowest convenient temperature. On cooling to this temperature some of the water precipitated from solution may, in some instances, separate. In this event the alkaline material need be added only in the amount determined by the fog and dissolved water remaining and not by the entire original water content.

The process is not to be confused with dehydration processes where emulsions, usually of crude oil and dispersed brine, are mixed with de-emulsifying agents to destabilize the oil-water interfaces so that coalescence of the dispersed droplets occurs when a controlled agitation brings two droplets into contact. In such processes the coalescence is continued until the coalesced masses are of such size as to gravitate from the oil. In the present process there is no coalescence and separation of the aqueous droplets and the over-all aqueous content of the hydrocarbon product remains the same albeit any existing fog is caused to disappear. The amount of aqueous medium present must not substantially exceed that which the hydrocarbon product can take up after the surface-active agent has been formed in situ and at the lowest temperature at which protection is desired. If the hydrocarbon product contains more than such small amount of aqueous medium it should be dehydrated by other methods before applying the process of the present invention. The present process is best suited to hydrocarbon products containing less than a few hundredths of a per cent of aqueous material, dissolved or precipitated; and usually, unless the hydrocarbon product is supersaturated, less than .01% of the aqueous medium or to hydrocarbon products containing water of solubility not substantially in excess of the amount required to saturate the hydrocarbon product at about 150° F. when the surface-active agent is not present.

Furthermore, the present invention is principally effective only upon aqueous droplets of the size of those found in fogs formed upon cooling of a water-saturated oil. If coarser droplets are present, as from moderately strong emulsification of liquid water into the oil, the action of the invention is relatively poor because of the low rate of solution of large drops and because of the probably much larger amounts of water required to be dissolved.

The alkaline material can be added to the hydrocarbon product in concentrated form or in solution in an essentially anhydrous solvent and injected into a flowing stream of the hydrocarbon product by use of a suitable proportioning means or thoroughly mixed with the hydrocarbon product in a storage tank. When using ammonia, a tank of liquid ammonia can be vented through a pressure-relief valve or pressure regulator, the gaseous ammonia being proportioned into a stream of the hydrocarbon product by a suitable setting of the valve or regulator. Alternatively, a small stream of a solvent, e. g., a small stream of the same or compatible hydrocarbon can be saturated with the ammonia gas and blended with a stream of the hydrocarbon product.

The present invention contemplates a suitable method for predetermining the most desirable kind or class of additives to be used and for predetermining quantitatively the amount to be added to attain the desired objective. The presence of a fog and its comparative density can be determined roughly by visual methods. By the same token, the required amount and character of the additive can be roughly determined by mere visual inspection methods. However, the present invention comprehends more exact testing of such fogs.

Generally speaking, in the preferred visual determination of the necessary amount and best character of alkaline material to be employed, a sample of the acid-containing hydrocarbon product, which has been carefully excluded from agitation with air, is introduced into a 4-oz. screw-cap glass bottle so as to fill it within a few tenths of a milliliter of its total capacity. The alkaline reagent is then added in a predetermined amount and the tightly closed bottle immersed in a cooling bath. The bottle is observed periodically until the desired cooling has been attained and the degree of fog formation is then visually observed in diffused daylight. For detection of extremely slight fog formation, the direct rays of the sun are used for the examination. The comparative degree of fog formation can be determined by comparison with a control bottle containing the same hydrocarbon product and which has been subjected to the same treatment except for the addition of the reagent.

Standardized procedures are desirable and the following method, specified in greater detail, has been found well suited to the visual method of determining the potency of various additives: The hydrocarbon product is first saturated with water by shaking a relatively large sample in a bottle with 20% by volume of distilled water at about 75° F. After a few minutes settling, the water-saturated supernatant hydrocarbon product is poured, with a minimum of agitation, into centrifuge tubes which are completely filled, stoppered and centrifuged until the product is bright. Care is always taken to avoid more than the absolute minimum of exposure to air or agitation since this tends to remove moisture and consequently lower the amount of fog produced on cooling.

Several 4-oz. screw-cap glass bottles are filled with this saturated hydrocarbon product to within a fraction of a milliliter of capacity. One of these bottles is used as a control but the various chemicals to be tested are added respectively to the remaining bottles, the chemicals being usually added in a suitable solvent, usually a hydrocarbon, by use of a graduated pipet. The chemical and the hydrocarbon product in each bottle are mixed by twirling the bottle, after which the bottle is immersed in a cold bath at about 25° F. The bottles are twirled frequently to assure a uniform temperature throughout their contents. After a period of time, found by previous experience to be sufficient to cool the contents to about 30° F., the bottles are examined in strong northern daylight to detect the extent of fogging which has occurred. If detection of very slight fogging is desired, the bottles are examined in the direct rays of sunlight. The blank or control bottle, subjected to the same cooling but to which no chemical has been added, gives a standard of comparison with untreated hydrocarbon product. Comparison of the various bottles containing the various reagents will indicate the comparative potency of the additives.

If it is desired to determine the minimum amount of a given additive which is required for fog suppression, the sample of the hydrocarbon product is tested directly without presaturation with water. For example, varying amounts of the additive can be mixed with the hydrocarbon product in the various bottles which are then cooled, as above, and visually observed. As before, a control bottle, containing no additive, can be used in the comparison.

The temperatures mentioned above are illustrative of those most commonly encountered in problems of fog prevention. Modifications in the above procedures, suitable to other temperature ranges, will be readily apparent to those skilled in the art.

Even greater accuracy can be obtained by use of photometric measurements in determining the presence or quantity of visible fogs. In a preferred photoelectric method of testing, a metal cell is employed, the cell providing glass windows for the entrance and exit of a beam of light. The intensity of the emergent beam is measured by means of a photoelectric cell. To prevent fogging of the glass windows of this cell because of atmospheric moisture, the windows, light source and photoelectric cell are enclosed in a suitable chamber containing a quantity of desiccant which maintains the interior of the chamber dry. The lower portion of the metal cell may extend into the cold bath.

When using such cells, the sample of the hydrocarbon product is introduced into the cell, agitated by means of a stirrer and the light transmission observed simultaneously with the reading of a thermometer disposed in the cell to indicate the temperature of the hydrocarbon product. The observed percentage of light transmitted by the hydrocarbon product is then plotted against the observed temperature thereof. This photoelectric method permits determination of very small differences in potency between different types of additives.

Using the same photoelectric method, it is desirable to make a comparison run, employing a hydrocarbon product which has been dried by bubbling with nitrogen gas. From this run a characteristic curve of the hydrocarbon product can be plotted, showing the relationship between light transmission and temperature, in the absence of fogs resulting from the precipitation of water from solution. With some hydrocarbon products, the light transmission will vary with temperature due to the precipitation of wax or other materials upon cooling. The characteristic curve avoids the possibility of confusing such precipitants with precipitated moisture.

As an example of the formation of a fog suppressant in situ, the following tests are cited. A California Diesel fuel containing naphthenic acids equivalent to 360 P. P. M. of sodium hydroxide was approximately saturated with anhydrous ammonia by bubbling the gas through the oil. This oil which was then found to contain 754 P. P. M. of total ammonia content was used as the reagent in a series of tests in which 5, 4, 3, 2, 1 and 0 ml., respectively, were added to 120 ml. samples of the same California Diesel fuel which had been saturated with water at 75° F. It was found that the bottle to which no ammonia-saturated Diesel fuel had been added produced a heavy fog on cooling to 34° F. The bottle to which 1 ml. of the ammonia in Diesel fuel reagent had been added produced a very small trace of fog, while the other bottles with larger quantities remained brilliant and fog-free at the reduced temperature. The bottle containing 1 ml. of ammonia-in-Diesel-fuel reagent represented the addition of one part of anhydrous ammonia to 159,000 parts of oil or 0.37 millimols/liter.

To demonstrate that the substance responsible for the fog suppression was ammonium naphthenate formed in situ, a sample of this same California Diesel fuel was extracted with aqueous sodium hydroxide solution, thereby producing an oil essentially free of naphthenic acids. It was found that the introduction of any quantity of ammonia up to sixteen times the amount which was sufficient to produce a complete fog suppression in Diesel fuel containing naphthenic acids was completely ineffective in this Diesel fuel which had previously been water-saturated at 75° F. The addition of naphthenic acids to these last samples, when ammonia was already present, was found to lead to fog suppression.

In another series of tests, a 4-oz. bottle containing a California Diesel fuel saturated with water at 72° F. was cooled to 42° F. The formation of a heavy fog was observed. This bottle was then warmed to clear the fog by solution and there was then added 45 mg. of crude naphthenic acids and 2 ml. of naphthenate-free Diesel fuel saturated with ammonia. On cooling this solution to 31° F., no fog was formed.

Various changes and modifications in the above-described procedures will be apparent to those skilled in the art and fall within the scope of the appended claims.

I claim as my invention:

1. A method of preventing the appearance of a water-of-solubility fog in a substantially transparent hydrocarbon product which contains dissolved water up to saturation and which produces such a fog when cooled below an existing temperature because of precipitation of a portion of said dissolved water, which method comprises reacting in situ in the hydrocarbon product at said existing temperature minute amounts of surface-active-agent-forming acidic and alkaline materials to form a minute amount of a surface-active agent in situ in the hydrocarbon product, said acidic material being organic and said alkaline material being substantially anhydrous and capable of reacting with said organic acidic material to produce said surface-active agent.

2. A method as defined in claim 1, in which said alkaline material is a nitrogen-containing base.

3. A method of preventing the appearance of a water-of-solubility fog in a substantially transparent hydrocarbon product which contains dissolved water up to saturation and which produces such a fog when cooled below an existing temperature because of precipitation of a portion of said dissolved water, said hydrocarbon product containing organic acidity reactable with an alkaline material to form a surface-active agent; which method comprises adding to the hydrocarbon product a minute amount of such alkaline material in substantially anhydrous state and in amount sufficient to react with part but not all of said organic acidity to form a minute amount of a surface-active agent in situ in the hydrocarbon product.

4. A method as defined in claim 3, in which the organic acidity in the hydrocarbon product comprises essentially naphthenic acids.

5. A method as defined in claim 1, in which the amount of alkaline material reacted in situ is about .035–1.75 millimols/liter of the hydrocarbon product.

6. A method as defined in claim 3, in which the amount of alkaline material added is about .035–1.75 millimols/liter of the hydrocarbon product, said acidic material being organic and said alkaline material being substantially anhydrous and capable of reacting with said organic acidic material to produce said surface-active agent.

7. A method as defined in claim 1, in which said alkaline material is ammonia.

8. A method as defined in claim 1, in which said alkaline material is ammonia, the amount of ammonia reacted in situ being about .035–1.75 millimols/liter of the hydrocarbon product.

9. A method as defined in claim 3, in which the organic acidity in the hydrocarbon product comprises essentially naphthenic acids and in which the alkaline material is ammonia.

10. A method as defined in claim 3, in which the organic acidity in the hydrocarbon product comprises essentially naphthenic acids and in which the alkaline material is ammonia, the amount of ammonia reacted in situ being about .035–1.75 millimols/liter of the hydrocarbon product.

11. A method as defined in claim 1, in which the alkaline material and at least a part of the acidic material are separately added to the hydrocarbon product.

12. A method of processing a hydrocarbon product containing naphthenic acids capable of reacting with a substantially anhydrous alkali to produce a surface-active agent in the product to produce a finished product inhibited against the formation therein of water-of-solubility fogs when cooled, which method includes the steps of: mixing with such hydrocarbon product an aqueous alkaline solution while limiting the amount of the solution to neutralize only a portion of said naphthenic acids and form aqueous soaps dispersed in the hydrocarbon product; separating substantially all of said aqueous soaps to produce an intermediate hydrocarbon product which contains water of solubility which is precipitable upon cooling of the intermediate hydrocarbon product and which intermediate hydrocarbon product contains a residual amount of said naphthenic acids; and adding to said intermediate hydrocarbon product a minute amount of said substantially anhydrous alkali to neutralize a part but not all of said residual amount of said naphthenic acids remaining in the intermediate hydrocarbon product to form in situ therein a minute amount of a surface-active agent, thus producing said finished product inhibited against the formation of water-of-solubility fogs upon cooling.

13. A method as defined in claim 12, in which said substantially anhydrous alkali is ammonia.

14. A method as defined in claim 12, in which said substantially anhydrous alkali is ammonia, the amount of ammonia being between about .035–1.75 millimols/liter of the intermediate hydrocarbon product.

WILLIAM F. EBERZ.

REFERENCES CITED

The following references are of record in the file of this patent:

UNITED STATES PATENTS

| Number | Name | Date |
| --- | --- | --- |
| 1,347,734 | De Cew | July 27, 1920 |
| 1,614,735 | Kirschbraun | Jan. 18, 1927 |
| 2,316,739 | Cook | Apr. 13, 1943 |